(12) United States Patent
Barr et al.

(10) Patent No.: US 6,198,609 B1
(45) Date of Patent: Mar. 6, 2001

(54) CPP MAGNETORESISTIVE DEVICE WITH REDUCED EDGE EFFECT AND METHOD FOR MAKING SAME

(75) Inventors: Ronald A. Barr, Mountain View; Billy W. Crue, San Jose; Ming Zhao, Fremont, all of CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/188,275

(22) Filed: Nov. 9, 1998

(51) Int. Cl.$^7$ ................................................ G11B 5/127
(52) U.S. Cl. ........................ 360/322; 360/319; 360/320
(58) Field of Search ................................. 360/113, 320, 360/322, 319

(56) References Cited

U.S. PATENT DOCUMENTS

| | | | |
|---|---|---|---|
| 3,714,559 | 1/1973 | Bate | 324/43 R |
| 4,115,827 | 9/1978 | Gooch | 360/121 |
| 4,317,149 | 2/1982 | Elser et al. | 360/126 |
| 4,800,454 | 1/1989 | Schwarz et al. | 360/103 |
| 5,005,096 | 4/1991 | Krounbi et al. | 360/113 |
| 5,018,037 | 5/1991 | Krounbi et al. | 360/113 |
| 5,373,624 | 12/1994 | Yan et al. | 360/126 |
| 5,390,061 * | 2/1995 | Nakatani et al. | 360/113 |
| 5,435,053 | 7/1995 | Krounbi et al. | 360/113 |
| 5,446,613 * | 8/1995 | Rottmayer | 360/113 |
| 5,465,186 | 11/1995 | Bajorek et al. | 360/113 |
| 5,600,880 | 2/1997 | Santini et al. | 29/603.14 |
| 5,657,191 * | 8/1997 | Yuan | 360/113 |
| 5,657,192 | 8/1997 | Cohen et al. | 360/126 |
| 5,668,688 * | 9/1997 | Dykes et al. | 360/113 |
| 5,959,811 * | 9/1999 | Richardson | 360/113 |
| 5,961,848 * | 10/1999 | Jacquet et al. | 216/22 |

FOREIGN PATENT DOCUMENTS 7-296340 * 11/1995 (JP).
8-329426 * 12/1996 (JP).

* cited by examiner

*Primary Examiner*—Brian E. Miller
(74) *Attorney, Agent, or Firm*—Hickman Coleman & Hughes, LLP

(57) ABSTRACT

A magnetoresistive (MR) device includes a sensor that has a first surface electrically coupled to a first lead structure, and a second surface electrically coupled to a second lead structure. The first lead structure and second lead structure each include an insulation layer with an aperture that is aligned with the sensor. Conductive materials, disposed within the apertures, are electrically coupled to said first and second surfaces of the sensor, respectively, thereby restricting the current flow of an applied current as it passes through the sensor. The first lead structure can further include a shield and a sense lead, each of which are electrically coupled with the conductive material disposed within the first aperture, while the second lead structure can further include a shield and sense lead which are electrically couple with said conductive material disposed with the second aperture. Also, the conductive material can form part of the shield or sense lead.

2 Claims, 5 Drawing Sheets

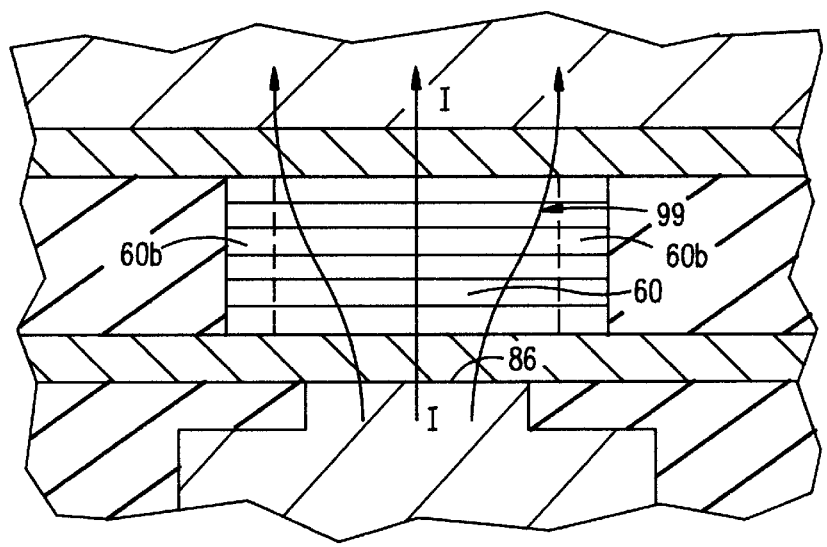
FIG. 4B
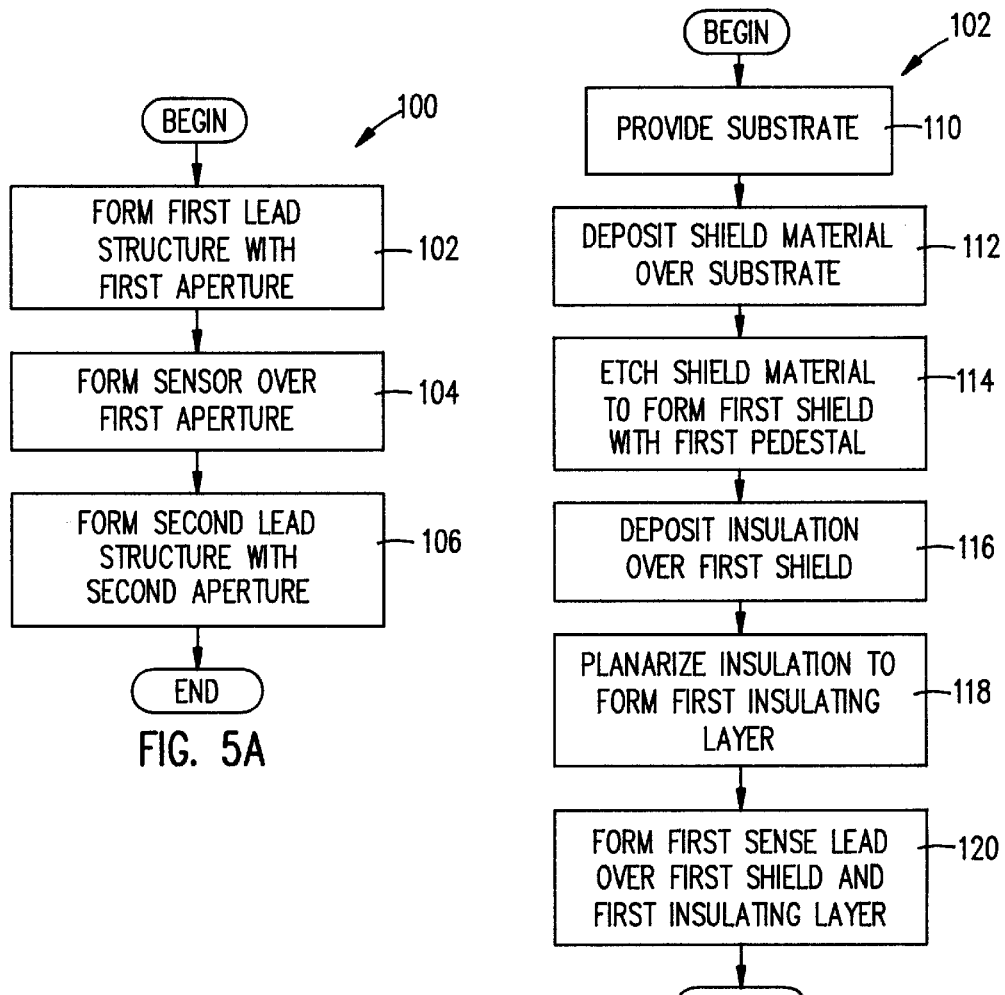
FIG. 5A
FIG. 5B

CPP MAGNETORESISTIVE DEVICE WITH REDUCED EDGE EFFECT AND METHOD FOR MAKING SAME

BACKGROUND OF THE INVENTION

This invention relates generally to magnetic disk drives, more particularly to magnetoresistive (MR) read heads, and most particularly to methods and structures for current-perpendicular-to-plane (CPP) operation of submicron GMR heads.

Magnetic disk drives are used to store and retrieve data for digital electronic apparatuses such as computers. In FIGS. 1A and 1B, a magnetic disk drive 10 of the prior art includes a sealed enclosure 12, a disk drive motor 14, a magnetic disk 16, supported for rotation by a drive spindle SI of motor 14, an actuator 18 and an arm 20 attached to an actuator spindle S2 of actuator 18. A suspension 22 is coupled at one end to the arm 20, and at its other end to a read/write head or transducer 24. The transducer 24 typically includes an inductive write element with a sensor read element (shown in FIG. 1C). As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Various magnetic "tracks" of information can be read from the magnetic disk 16 as the actuator 18 causes the transducer 24 to pivot in a short arc as indicated by the arrows P. The design and manufacture of magnetic disk drives is well known to those skilled in the art.

FIG. 1C depicts a magnetic read/write head 30 including a read element 32 and a write element 34. The edges of the read element 32 and write element 34 also define an air bearing surface ABS, in a plane 33, which faces the surface of the magnetic disk 16.

Read element 32 includes a first shield 36, a second shield 38, and a read sensor 40 that is located between the first shield 36 and the second shield 38. One type of read sensor 40 is a magnetoresistive (MR) sensor which can be a variety of types, such as anisotropic magnetoresistive (AMR), spin valve, and giant magneto-resistive (GMR). The particular read sensor 40 shown is a multilayer GMR, formed of successive layer pairs 42 of various materials. Such an MR device typically can be formed by depositing the layer pairs 42 one upon the next to form a multilayer wafer (not shown). The material of each layer and the ordering of layers are appropriately selected to achieve a desired read performance. Multiple portions of the wafer are then removed to provide multiple read sensors 40.

Write element 34 of FIG. 1C is typically an inductive write element and includes a first yoke element 44 and the second shield 38, which forms a second yoke element, defining a write gap 46 therebetween. The first yoke element 44 and second yoke element 38 are configured and arranged relative to each other such that the write gap 46 has a particular throat height, TH. Also included in write element 34, is a conductive coil 48 that is positioned within a dielectric medium 50. As is well known to those skilled in the art, these elements operate to magnetically write data on a magnetic medium such as a magnetic disk 16.

The operation of the read element 32 can be better understood with reference to the cross-sectional view of read element 32 in FIG. 1D. A sense current I is caused to flow 15 through the read sensor 40. While in FIG. 1D the sense current is shown injected through the shields (which act as leads), in other configurations the read sensor electrically isolated from the shields, with additional leads injecting the sense current I. Specifically, FIG. 1D depicts a four-point configuration, where a lead lies between each shield and the read sensor. In such a configuration, the sense current I passes through the first shield 36, through a first sense lead 37, then through the read sensor 40 to a second sense lead 39 and to the second shield 38. As the sense current I passes through, the read sensor exhibits a resistive response, resulting in an output voltage that can be quantified by measuring the voltage drop across the two sense leads 37, 39. The higher the output voltage, the greater the precision and sensitivity of the read sensor in sensing magnetic fields from the magnetic medium 16.

The output voltage is affected by various characteristics of the read element 32. For example, the greater the component of a sense current that flows perpendicular to the read sensor layers, as indicated by the vector CPP, the greater the output voltage. This component of sense current is the current-perpendicular-to-plane, CPP, component. For example, the sense current I of FIG. 1D is CPP. On the other hand, the component of a sense current that flows along (or parallel to) the read sensor layers 42 is the current-in-plane, CIP, component. Such current would occur in the read sensor 40 of FIG. 1D perpendicular to the sense current I either parallel to, as indicated by the vector CIP, or through the plane of the view.

In the configuration of FIG. 1D, the first and second shields 36, 38 are conductive and are in electrical contact with the read sensor 40. Here, the sense current I of the read sensor 40 flows, for example, from the first shield 36 to the second shield 38 through the read sensor 40. As the sense current I flows through the read sensor 40, the current flows substantially perpendicularly to the orientation of the layers 42 of the read sensor 40. Thus, substantially all of the sense current I is CPP, i.e., the read sensor 40 operates in CPP mode. Other read sensors may be designed to operate with varying CPP and CIP components of the sense current. However, it is desirable to maximize the CPP component to maximize the output voltage of the read sensor. The design and manufacture of such magnetoresistive heads, such as read sensor 40, are well known to those skilled in the art.

Although current GMR read sensors such as read sensor 40 have been used in the past, their performance is limited. In particular, various aspects of the read sensor fabrication can result in undesirable edge circuit paths between edges E of the read sensor layers. For example, as is shown in FIG. 1E, if etching is performed on multiple layers in the same operation, there can be redeposition 43 of the etched material of one layer upon the etched edge of another layer. Also, during lapping of the read sensor to form the air bearing surface ABS, or during a cutting operation to remove a single read sensor from a wafer, material can be smeared from one layer to another layer. In addition, when the read sensor layers are exposed to high temperatures diffusion might occur between the layers. When particular redeposition, smearing, or diffusion occurs between conductive layers, circuit paths can be formed between those layers at their edges E. Additionally, while such circuit paths can be formed between layers of a variety of types of read sensors, the problem can be more extensive or more likely in read sensors which have layers of smaller thicknesses, for example GMR sensors.

When such circuit paths are formed, the sense current I can be disrupted, as is illustrated by the charge flow lines 44 of FIG. 1E. The charge, illustrated by charge flow lines 44a, that flows through the sensor in a region away from the edges E, the edge-free sensor portion 46, is substantially unaffected by the edge circuit paths and is primarily in CPP mode. However, the charge, illustrated by charge flow lines 44b and 44c, that flows through the sensor in a region nearer to the edges E, the edge sensor portion 48, can be shunted away from a direct path between the first shield 36 and the second shield 38. Such shunting reduces the sensitivity of the device because current is directed away from and around the multilayer. The shunted portion of the current does not typically exhibit any MR or GMR effect because an edge circuit path is typically an unstructured mixture of materials that have been re-sputtered or re-deposited from the etched portion of the device. This phenomenon is sometimes referred to as an edge effect While it may be possible to remove the material along the edges E, it would be technically very difficult and may have undesirable side effects. For example, such a process would likely change the dimensions of the read sensor, because the etching technique used will not be able to differentiate between the redeposited material and the sensor itself Also, the process would necessarily result in the removal of other portions of the device, such as the leads. Furthermore, with increasingly dense media being used to provide more data, and the need for correspondingly smaller read devices, read sensors will have larger edge-to-volume ratios which can be expected to increase the impact of the edge effect on read sensor performance.

Thus, what is desired is a GMR head, and a method for making the same, that can operate in CPP mode with increased performance despite the existence of edge circuit paths, while limiting cost and complexity.

SUMMARY OF THE INVENTION

The present invention provides a magnetoresistive element and method for making the same that provides higher performance in the presence of edge circuit paths, and can be fabricated with low cost and complexity. This is accomplished by reducing shunting of the sense current in the sensor by restricting the sense current at its input to or output from the read sensor, or both.

According to an embodiment of the present invention, a magnetoresistive (MR) device includes a sensor having a first sensor surface with a first sensor surface area, and a second sensor surface with a second sensor surface area. The MR device also includes a first lead structure electrically coupled to the first sensor surface, where the first lead structure includes an insulating layer provided with a first aperture aligned with the first sensor surface.

In addition, the first aperture has a first aperture cross-sectional area that is less than the first sensor surface area. The first lead structure further includes an electrically conductive material within the first aperture. The MR device further includes a second lead structure electrically coupled to the second sensor surface, whereby an electric current can be caused to flow through the sensor between the first lead structure and the second lead structure. With this structure, the electric sensing field density is reduced along edge portions of the sensor where redeposition and damage can reduce the sensor efficiency, thereby increasing the sensor effectiveness.

In another embodiment of the present invention, the second lead structure includes an insulating layer provided with a second aperture. The second aperture is aligned with the second sensor surface, and has a second aperture cross-sectional area that is less than the second sensor surface area The second lead structure further includes an electrically conductive material within the second aperture. This structure can further reduce the electric sensing field density along the edge portions of the sensor, and therefore result in higher sensor effectiveness.

In yet another embodiment of the present invention, a system for reading from and writing to magnetic media includes a read/write head that includes a write element and a read element. The read element includes a sensor having a first sensor surface with a first sensor surface area, and a second sensor surface with a second sensor surface area. The read element further includes a first lead structure electrically coupled to the first sensor surface. The first lead structure includes a first insulating layer provided with a first aperture that is aligned with said first sensor surface. Also, the first aperture has a first aperture cross-sectional area that is less than the first sensor surface area, and the first lead structure further includes an electrically conductive material within the first aperture. The read element also includes a second lead structure electrically coupled to the second sensor surface, whereby an electric current can be caused to flow through said sensor between said first lead structure and said second lead structure. The system also includes a media support capable of supporting a magnetic media that is to be accessed, and a suspension system capable of supporting the read/write head over the magnetic media that is to be accessed. With such a sensor, the system can read data from a magnetic medium more precisely and with greater sensitivity, thereby providing reading capability with high density media.

In still yet another embodiment of the present invention, a method for fabricating a magnetoresistive device includes forming a first lead structure that has a first insulating layer with a first aperture. The first aperture has a first aperture cross-sectional area, and the first lead structure further includes a first conductive material disposed within the first aperture. The method also includes forming a sensor over the first lead structure, the sensor having a first surface with a first surface area and a second surface with a second surface area. The first surface is aligned with the first aperture and the first surface area is larger than the first aperture cross-sectional area. In addition, the method includes forming a second lead structure electrically connected to the second sensor surface. This forming of the second lead structure can include forming a second insulating layer having a second aperture with a second aperture cross-sectional area aligned with the second sensor surface. In addition, the second aperture cross-sectional area is less than the second sensor surface area. This method provides, with minimal complexity and cost through standard fabrication processes, a sensor that can exhibit high sensitivity and precision.

These and other advantages of the present invention will become apparent to those skilled in the art upon a reading of the following descriptions of the invention and a study of the several figures of the drawing.

BRIEF DESCRIPTION OF THE DRAWINGS

The present invention will be readily understood by the following detailed description in conjunction with the accompanying drawings, and like reference numerals designate like elements.

FIG. 4B is a schematic of an electric sensing field passing through the read sensor of FIG. 4A;

FIG. 5A is a flow chart of a method for forming a read element according to an embodiment of the present invention;

FIG. 5B is a flow chart further detailing an operation of the method of FIG. 5A which is a method for forming a first lead structure;

DETAILED DESCRIPTION OF THE PREFERRED EMBODIMENTS

FIGS. 1A–E were discussed with reference to the prior art. FIGS. 2–4 show cross-sectional views of read elements according to various embodiments of the present invention.

Figure 1A:
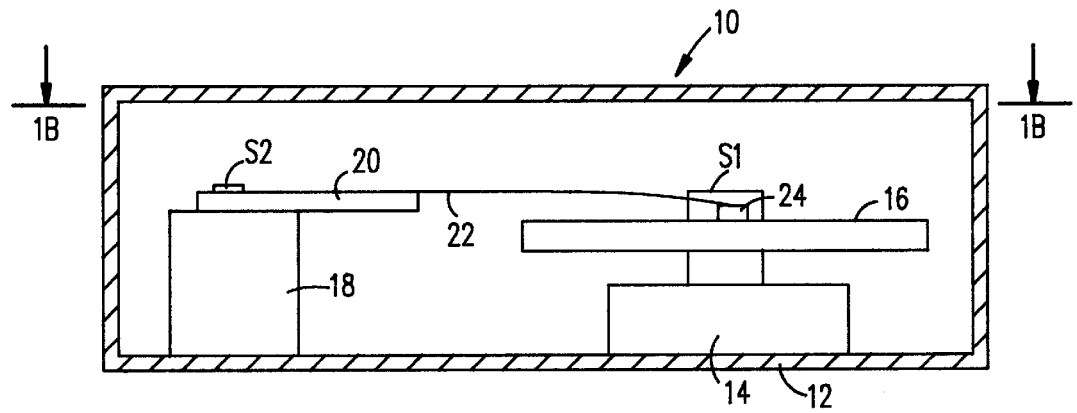
FIG. 1A is a partial cross-sectional front elevation view of a magnetic disk drive assembly.
Figure 1B:
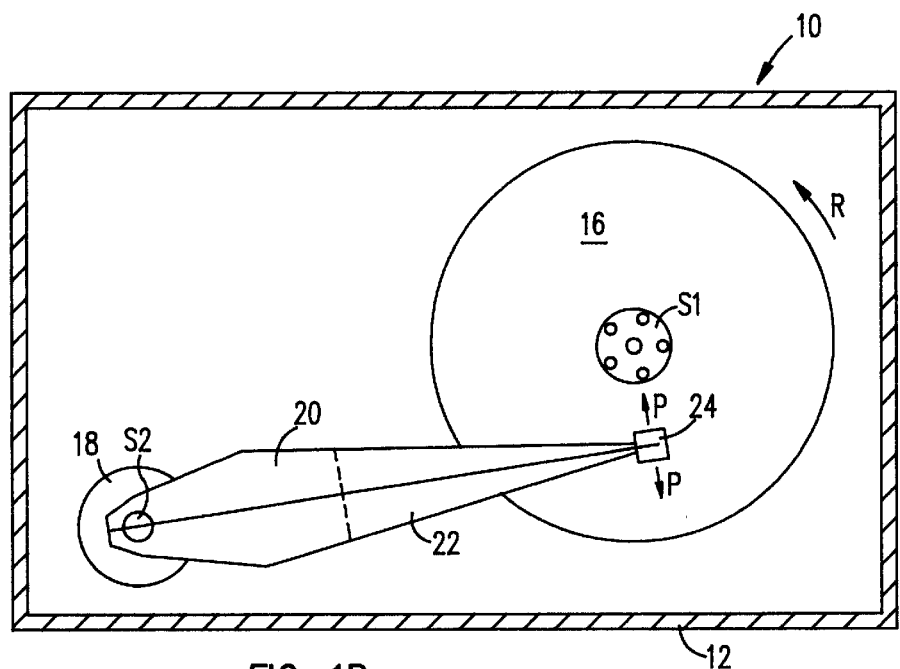
FIG. 1B is a top plan view taken along line 1B—1B of FIG. 1A.
Figure 1C:
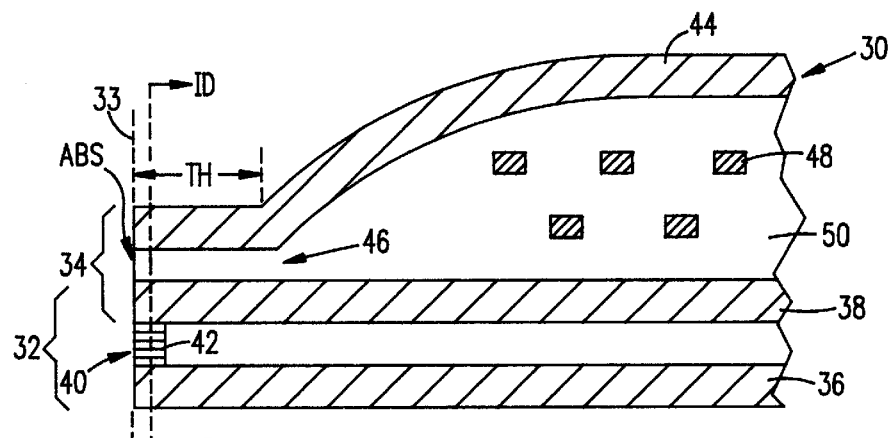
FIG. 1C is a cross-sectional side view of a prior art read-write head incorporating a multilayer magnetoresistive read sensor.
Figure 1D:
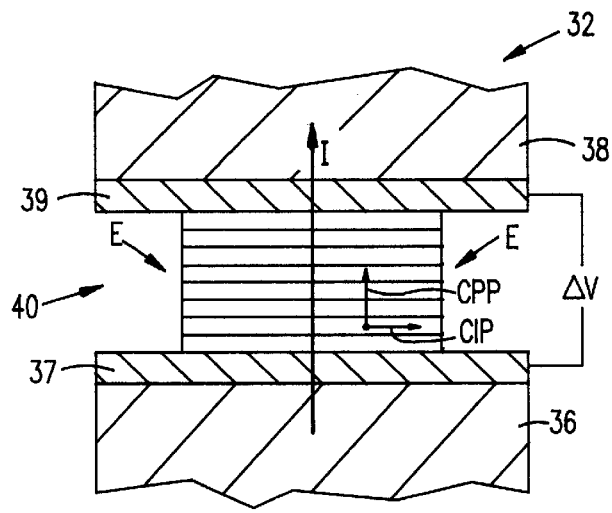
FIG. 1D is a perspective view of the prior art read element of FIG. 1C.
Figure 1E:
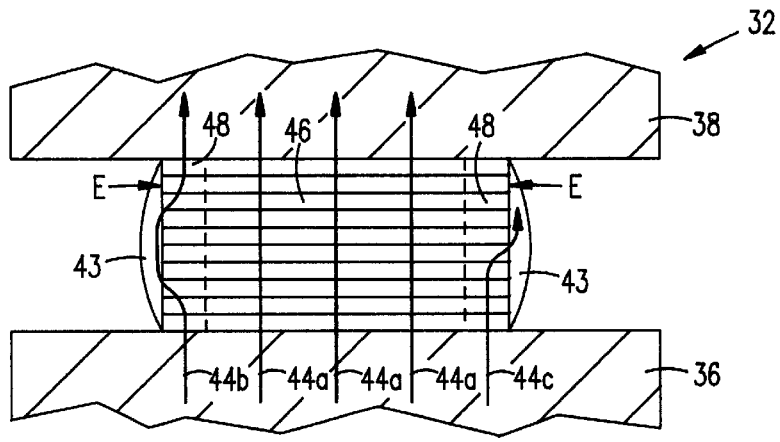
FIG. 1E is a cross-sectional elevation view of a prior art read element with redeposition.
Figure 2A:
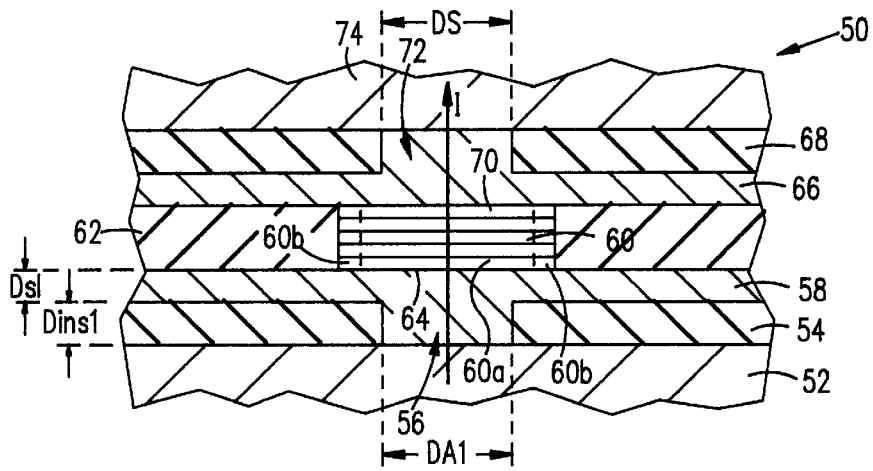
FIG. 2A is a cross-sectional view of a read element across a plane parallel to the ABS, according to an embodiment of the present invention.
Figure 3:
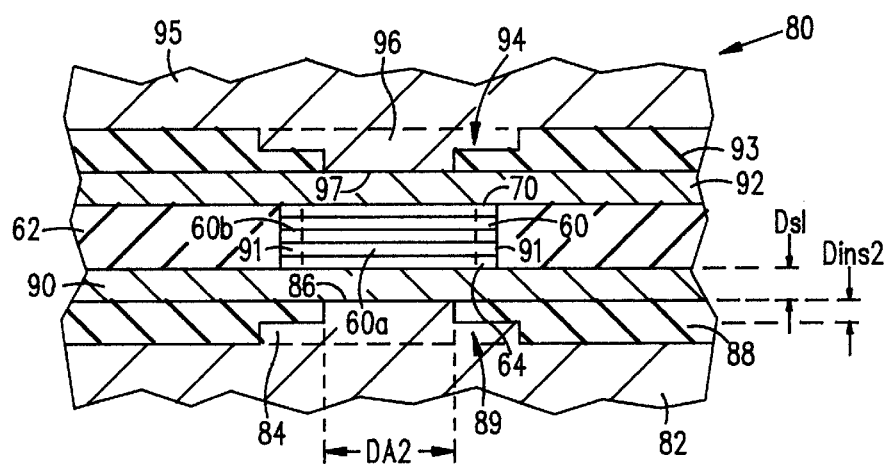
FIG. 3 is a cross-sectional view of a read element across a plane parallel to the ABS, according to another embodiment of the present invention.

FIG. 2A depicts a cross-sectional view of a read element 50 as viewed across a plane parallel to the air-bearing surface ABS, according to an embodiment of the present invention. Above a substrate (not shown), lies a first shield 52. The first shield 52 can be formed of any suitable material capable of providing shielding to a subsequently formed sensor 60, as well as conducting a sense current I from a current source (not shown). For example, a magnetic material such as NiFe can be used. Over the first shield 52, a first insulating layer 54, including a first aperture 56, is disposed. The first insulating layer 54 can be formed of a suitable insulation material, such as $Al_2O_3$ or SiN. The depth Dins1 of the first insulation layer near the first aperture 56 can be in the range of about 100 angstroms to about 1000 angstroms. Also, a first sense lead 58 overlies the first insulating layer 54, and fills the first aperture 56, thereby electrically coupling with the first shield 52. The first sense lead 58 is formed of a conductive material such as gold (Au), or other material that exhibits low resistance. Additionally, the depth Ds1 of the first sense lead 58 outside the first aperture 56 can be in the range of about 10 angstroms to about 500 angstroms, with about 50 angstroms working well.

A sensor 60 is disposed above the first sense lead 58 within a second insulating layer 62. Further, the sensor 60 is aligned with the first aperture 56. Also, the surface area (as measured in a plane perpendicular to the viewing plane of FIG. 2A) of a first surface 64 of the sensor 60, that is electrically connected to sense lead 58, is larger than a cross-sectional area (also measured in a plane perpendicular to the viewing plane of FIG. 2A) of the aperture 56. Thus, the sensor 60 is sized and aligned relative to the first aperture 56 such that an edge-free portion 60a of the sensor 60 is aligned with the first aperture 56. For example, a diameter DS of the sensor 60 can be in the range of about 0.05 microns to about 0.5 microns, while a diameter DAI of the first aperture 56 can be in the range of about 10% to about 50% less than the diameter DS of the sensor 60. This leaves an edge portion 60b of the sensor 60 not aligned with the first aperture 56. While the sensor 60 shown in FIG. 2A is depicted as a giant magnetoresistive (GMR) device, the present invention can also work with other multilayer read sensors such as spin-dependent tunneling (SDT) sensors and other devices that can operate in the CPP mode.

A second sense lead 66 and a third insulating layer 68 overlie the sensor 60 and the second insulation layer 62. The second sense lead 66 is electrically coupled with a second surface 70 of the sensor 60. Also, a portion of the second sense lead 66 is disposed within a second aperture 72 that is included in the third insulation layer 68. The second aperture 72 has a cross-sectional area (as measured in a plane perpendicular to the plane of viewing in FIG. 2A) that is smaller than a cross-sectional area of the second surface 70 of the sensor 60. Further, the second aperture 72 is aligned with the sensor 60, and more particularly it is aligned with the sensor edge-free portion 60a and not aligned with the sensor edge portion 60b. Although FIG. 2A depicts such relative sizing and alignment of the sensor 60, the first aperture 56, and the second aperture 72 from a single view, it should be understood that the same relative sizing and alignment holds true across substantially the entire sensor 60 and apertures 56 and 72.

A second shield 74 overlies the second sense lead 66 and the third insulating layer 68. While a shielded read element is depicted in FIG. 2A, the present invention can also be practiced in unshielded form without the inclusion of the first shield 52 and the second shield 74. It should be understood that the second sense lead 66, third insulating layer 68, and second shield 74 can be formed of the same types of materials, and with the same depths, as the first sense lead 58, first insulating layer 54, and first shield 52 can be made. Also, while the read element 50 shown in FIG. 2A is a four-point configuration having four leads (i.e., the first and second shields 52 and 74 and the first and second sense leads 58 and 66), the present invention can also be practiced without the inclusion of the first and second sense leads 58 and 66 between the first and second insulation layers 54 and 68 and the sensor 60, as long as conductive material is within the first and second apertures and electrically connected to the sensor 60 and a sense current source. Additionally, the depths of the various layers between the first shield and the second shield are chosen to maintain a desired distance between the first and second shields, which in turn affects the read element efficiency.

Figure 2B:
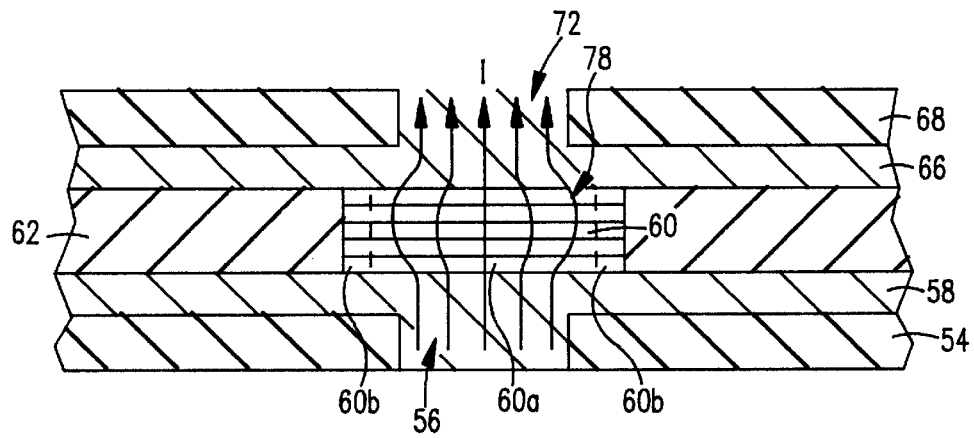
FIG. 2B is a schematic of an electric sensing field passing through the read sensor of FIG. 2A.

When a sense current I is passed through the sensor 60, for example between the first shield 52 and the second shield 74, the first aperture 56 and second aperture 72 affect the electric sensing field 80 as shown in FIG. 2B. For the most part, the electric sensing field 80 is confined to a portion of the sensor 60 having a cross-sectional area, as measured in a plane perpendicular to the sense current I, that is substantially similar to the cross-sectional area of the first aperture 56 and second aperture 72. However, due to resistance spreading, the electric sensing field 80 flows through a somewhat larger portion of the sensor 60. Nevertheless, with proper sizing and alignment of the first aperture 56 and second aperture 72 relative to the sensor 60, the electric sensing field 80 still can be limited to the edge-free portion 60a of the sensor 60. It is understood that by reducing the electric sensing field density in the edge portions 60b, that the edge effect is decreased, and a corresponding increase in sensor effectiveness is realized.

Because the alignment and sizing of the two apertures and the sensor affect the electric sensing field density in the edge portions 60b, and because the sensor effectiveness is sensitive to this amount of the electric sensing field density in the edge portions 60b, alignment and sizing during fabrication is critical. Thus, to limit the sensitivity of sensor effectiveness to fabrication tolerances, apertures having smaller cross-sectional areas can be used.

FIG. 3 shows a cross-sectional view, along a plane parallel to the air-bearing surface ABS, of a read element 80 according to another embodiment of the present invention. A first shield 82, including a first pedestal 84, overlies a substrate (not shown). The first shield 82 can be formed of any material that is suitable for providing magnetic shielding to a subsequently formed sensor 60, such as NiFe. The first pedestal 84 can be formed by any suitable method known to those skilled in the art, such as by ion milling in conjunction with photoresistive masks. While a two-tier pedestal is shown in FIG. 3, various other pedestal configurations can work according to the present invention, given appropriate sizing and alignment of a top surface 86 of the first pedestal 84 with respect to a subsequently formed sensor 60. For example, a three- or four-tiered pedestal can be used, or a pedestal can have a curvilinear, rather than stepped, boundary.

Over the first shield 82 lies a first insulating layer 88, leaving the top surface 86 of the first shield 82 exposed. Thus, the first pedestal 84 fills a first aperture 89, of the same size and shape, in the first insulating layer 88. In particular, the portion of the first aperture 89 that corresponds to a top tier 85 of the first pedestal 84, defines the aperture depth DA2. The minimum depth Dins2 of the insulating layer 88, adjacent to the top tier 85, can be in the range of about 100 angstroms to about 1000 angstroms. Also, a first sense lead 90 lies over the first shield 82 and the first insulating layer 88. The first sense lead 90 is formed of a conductive material, such as gold (Au), and is in electrical contact with the first shield 82. The depth Ds1 of the first sense lead 90, in a region near the first aperture 89, can be in the range of about 10 angstroms to about 500 angstroms, with about 50 angstroms working well.

Over the first sense lead 90 is a sensor 60, that has a first surface 64 electrically connected to the first sense lead 90 and which is aligned with the first aperture 89. While in FIG. 3 a GMR sensor is shown, other sensors that benefit from CPP mode operation, such as spin-dependent tunneling (SDT) sensors, can be used. The sensor 60 is within a second insulating layer 62 that covers the edges 91 of the sensor 60, while leaving the first surface 64 and the second surface 70 uncovered by insulation. A second sense lead 92 overlies the sensor 60 and the second insulation layer 62, in electrical contact with sensor 60. Along with the first sense lead 90, the second sense lead 92 can be used to measure the voltage change across the sensor 60. The second sense lead 92 can be formed of the same or similar materials and have the same or similar dimensions as can be the first sense lead. It should be noted, however, that the voltage levels that can be measured at the first and second leads 90 and 92 can be reduced by increasing their depths Ds1.

Over the second sense lead 92 is disposed a third insulation layer 93 that has a second aperture 94 aligned with the sensor 60. Further, a second shield 95 overlies the third insulation layer 93, with a portion of the second shield 95, a second pedestal 96 being within the second aperture 94. Thus, shape, size and alignment of the second pedestal 96 is determined by the shape, size and alignment of the second aperture 94. As with the first pedestal 84, the second pedestal 96 can have other forms than the two-tiered configuration shown. In particular, the size, shape and alignment of the second aperture 94 results in an area of a surface 97 of the second pedestal 96 being smaller than an area of a sensor second surface 70. Thus, as with the read element of FIG. 2A, current that is passed through the first aperture, second aperture, and sensor is substantially restricted to the edge-free portion 60a of the sensor 60. With such a read element having appropriate alignment and sizing, the electric sensing field of the sense current I, therefore, would be similar to that depicted in FIG. 2B. It should be understood that different relative alignments and sizes will result in different electric sensing fields, that will result in different electric sensing field densities within the sensor edge portions, and ultimately in different sensor effectivenesses.

Unlike the embodiment illustrated in FIG. 2A where the distance between the first and second shields 52 and 74 (i.e., the shield to shield spacing) is limited by the thickness of the sensor leads 58 and 66 and the insulating layers 54 and 68, in the embodiment of FIG. 3 the shield to shield spacing is limited only by the thickness of the sense leads 90 and 92. In addition, a multi-tiered pedestal, such as in FIG. 3, can increase the manufacturing yield of the device by limiting the region of the device that has very thin insulation layers, thereby decreasing yield losses due to shorting. For example, in FIG. 3 this tiered approach can be seen to increase the thickness of the first insulating layer 88 between the first shield 82 and the sense lead 90 by the thickness Dins2.

Figure 4A:
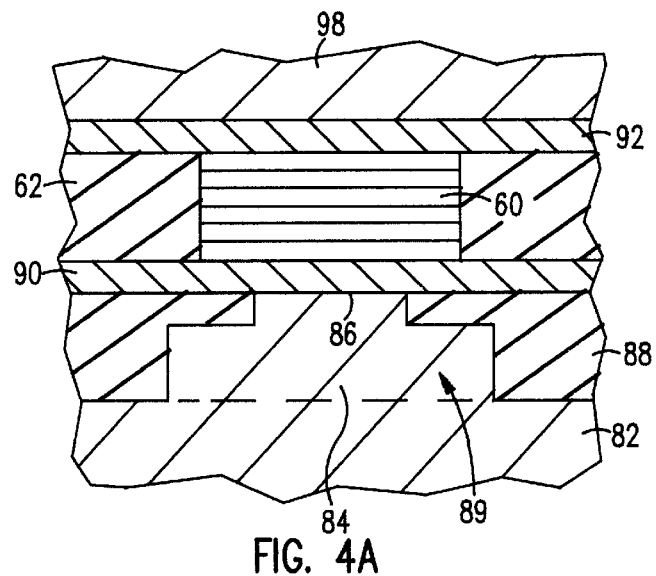
FIG. 4A is a cross-sectional view of a read element across a plane parallel to the ABS, according to yet another embodiment of the present invention.

FIG. 4A depicts a cross-sectional view, along a plane parallel to the ABS, of a read element according to yet another embodiment of the present invention. The read element includes the same first shield 82 with a first pedestal 84, first insulating layer 88 with an aperture 89, first sense lead 90, sensor 60, second insulating layer 62, and second sense lead 92 as in the read element of FIG. 3. However, instead of a second insulating layer with a second aperture filled with a second pedestal, the second sense lead 92 is covered with a second shield 98, without the inclusion of an aperture. Therefore, a current passing from the first shield to the second shield is restricted on only one side of the sensor 60, rather than two as is the case in the read elements of FIGS. 2A and 3. Thus, the electric sensing field 99 of such a current is less restricted within the sensor 60, as shown in FIG. 4B. In particular, the electric sensing field expands with increasing distance from the aperture 89 due to resistance spreading that is not influenced by a second aperture. However, while the electric sensing field 99 may extend through more of the sensor 60 than in the case of two apertures, appropriate size and alignment of the aperture surface relative to the sensor 60 can effectively reduce the electric sensing field density in the edge portions 60b of the sensor 60. For example, this can be accomplished by having a first sense lead with a depth Ds1 that is less than that of a first sense lead in a read element that includes two apertures. Also, the width Wa of the aperture can be made smaller than that of the apertures in a two aperture read element. With such restriction, the effectiveness of the sensor can still be increased in the presence of redeposition on or damage to the sensor edges 91. In addition, the fabrication process is simplified since the sensor effectiveness is affected by the relative alignment and sizing between only the one aperture and the, rather than between two apertures and the sensor as is the case with the read elements of FIGS. 2A and 3. Also, with only a single aperture, the aperture cross-sectional area need not be limited, for accommodation of fabrication tolerances, to the same degree as may be needed to accomplish desired relative alignment and sizing between two apertures and the sensor, as was described above with reference to the read element of FIG. 2A.

FIG. 5A depicts a flow chart of a method 100 for forming a read element according to an embodiment of the present invention. In operation 102, the first lead structure is formed with a first aperture. A sensor, such as a multi-layer sensor (e.g., a GMR or SDT device) is formed over the first aperture in operation 104. The viewed element is further constructed with the formation of a second lead structure having a second aperture in operation 106. Operation 102 is further detailed in the flow chart of FIG. 5B.

As is shown in FIG. 5B, a substrate is provided in operation 110. In operation 112, shield material is deposited over the substrate. This shield material is etched to form a first shield, with a first pedestal, in operation 114. This etching can be accomplished by any suitable known technique, such as by ion milling. In operation 116, insulation material is deposited over the first shield including the first pedestal. The insulation material is planarized, such as by chemical-mechanical polishing (CMP) to form the first insulating layer in operation 118. In the process of planarizing the insulation material, the first pedestal of the first shield is thereby exposed. In addition, a first sense lead is formed over the first shield and the first insulating layer in operation 120. The first sense lead can be formed by techniques known to those of ordinary skill in the art, such as plating or sputtering.

Figure 5C:
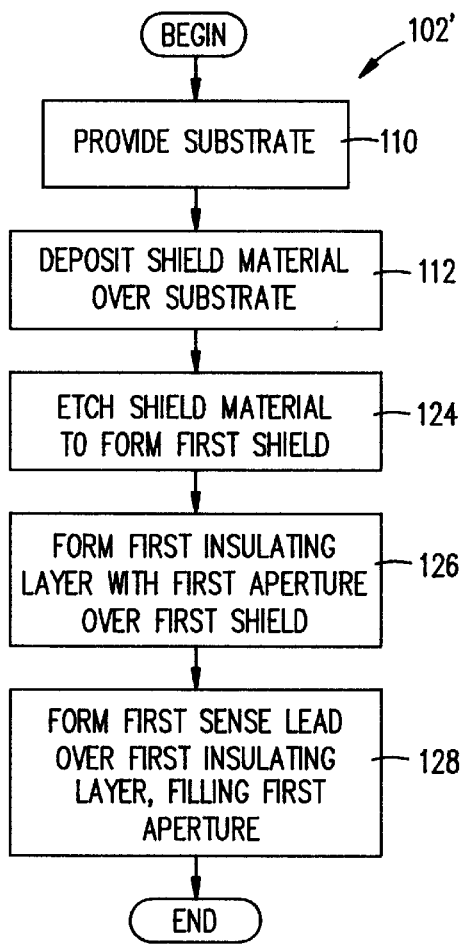
FIG. 5C is a flow chart fixer detailing an operation of the method of FIG. 5A which is an alternate method for forming a first lead structure.

FIG. 5C depicts a flow chart detailing the operations of an alternate operation 102' of the method 100 in FIG. 5A. In operations 110 and 112, a substrate is provided and shielded material is deposited over this substrate, respectively, such as in operations 110 and 112 of FIG. 5B. However, in operation 124, the shield material is etched to form a first shield without a pedestal. In operation 126 a first insulating layer is formed over the first shield. This formation includes the deposition of insulation material over the first shield. During this formation, a first aperture is included within the first insulating layer, for example by etching the insulation material. Alternatively, other techniques can be used to form the first insulation layer including the first aperture. As another operation of alternate operation 102', a first sense lead is formed in operation 128 over the first insulating layer and within the first aperture. Thus, the portion of the first sense lead that is within the first aperture is in contact with the first shield formed in operation 124.

Figure 5D:
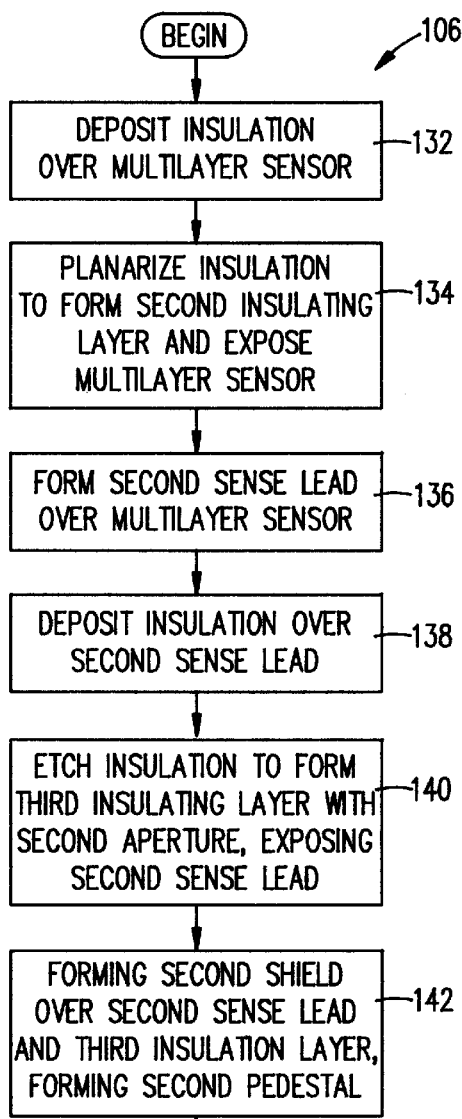
FIG. 5D is a flow chart further detailing an operation of the method of FIG. 5A which is a method for forming a second lead structure.

Operation 106 of the flow chart in FIG. 5A is furthered detailed in the flow chart of FIG. 5D. Insulation is deposited over the multi-layer sensor in operation 132. In operation 134, the insulation is planarized to form a second insulating layer and to expose the multi-layer sensor. Over the multi-layer sensor, a second sense lead is formed in operation 136. Operation 138 includes the deposition of insulation over the second sense lead, while operation 140 entails the etching of the insulation to form a third insulating layer. The etching of operation 140 includes the formation of a second aperture within the third insulating layer, and the exposing of a portion of the second sense lead adjacent to the second aperture. In operation 142, a second shield is formed over the second sense lead and the third insulation layer. The formation of the second shield includes the formation of a second pedestal within the second aperture and in contact with the second sense lead.

Figure 6:
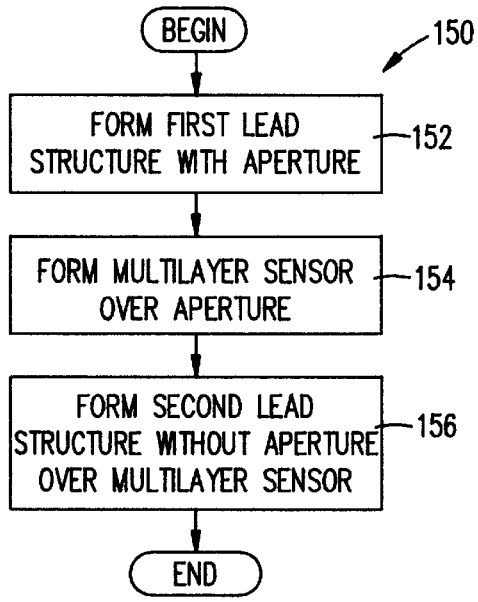
FIG. 6 is a flow chart of a method for forming a read element according to another embodiment of the present invention.

In FIG. 6 an alternate method 150 for forming a read element according to another embodiment of the present invention, is depicted in flow chart form. Method 150 includes the formation of a first lead structure having a first aperture in operation 102 and the formation of a sensor, such as a multi-layer sensor (e.g., a GMR or SDT device) over the aperture in operation 104. Operations 102 and 104 can be performed as detailed above with reference to FIGS. 5A, 5B, and 5C. However, in contrast to the method 100 of FIG. 5A, a second lead structure, without an aperture, is formed in operation 156 over the multi-layer sensor. This second lead structure can be formed by the formation of a second shield over the multi-layer sensor, through known techniques such as deposition and etching. Also, the second lead structure can include the formation of a second sense lead between the second shield and the multi-layer sensor, by known processes such as deposition and etching.

Similar current apertures and methods of their making can also be used with other sensor and read element configurations to restrict the electric sensing field to an edge-free portion of the sensor, thereby reducing the electric sensing field density in the edge portions. Thus, the present invention can be practiced by forming an aperture through which the sensing current passes, and which thereby reduces the electric sensing field density in the sensor edge portions, regardless of sensor orientation or location.

Also, although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A magnetoresistive device comprising:

a sensor having a first sensor surface with a first sensor surface area, and a second sensor surface with a second sensor surface area:

a first lead structure electrically coupled to said first sensor surface, where said first lead structure includes an insulating layer provided with a first aperture aligned with said first sensor surface, said first aperture having a first aperture cross-sectional area that is less than said first sensor surface area, a first conductive material disposed within said first aperture, a first shield formed of conductive material and including said conductive material disposed within said first aperture, and a first sense lead disposed between said first insulating layer and said first sensor surface and electrically coupling said conductive material within said first aperture to said first sensor surface, and a second lead structure electrically coupled to said second sensor surface: wherein said second lead structure includes an insulating layer provided with a second aperture that is aligned with said second sensor surface, said second aperture having a second aperture cross-sectional area that is less than said second sensor surface area, an electrically conductive material within said second aperture, a second shield formed of conductive material and including said conductive material disposed within said second aperture; and a second sense lead disposed between said second insulating layer and said second sensor surface and electrically coupling said conductive material within said second aperture to said second sensor surface, whereby an electric current can be caused to flow through said sensor between said first lead structure and said second lead structure.

2. A method for fabricating a magnetoresistive device comprising:

forming a first lead structure including a first insulating layer having a first aperture with a first aperture cross-sectional area said first lead structure further including a first conductive material disposed within said first aperture:

forming a sensor over said first lead structure, having a first surface with a first surface area and a second surface with-a second surface area, said first surface being aligned with said first aperture and said first surface area being larger than said first aperture cross-sectional area:

forming a second lead structure electrically connected to said second sensor surface, wherein forming said second lead structure includes forming a second insulating layer having a second aperture with a second aperture cross-sectional area aligned with said second sensor surface said second aperture cross-sectional area being less than said second sensor surface area:

wherein forming said first lead structure comprises:
providing a substrate;
depositing a shield material over said substrate;
etching said shield material, thereby forming a first shield having a first pedestal;
depositing insulation over said first shield;
planarizing said insulation, thereby forming a first insulating layer and exposing said first pedestal; and
forming a first sense lead over said first pedestal and over said first insulation layer; and wherein said forming said second lead structure comprises:
depositing insulation over said multilayer sensor,
planarizing said insulation, thereby forming a second insulating layer and exposing said multilayer sensor;
forming a second sense lead over said multilayer sensor;
depositing insulation over said second sense lead;
etching said insulation, thereby forming a third insulating layer and said second aperture, and exposing said second sense lead; and
depositing shield material over said second sense lead and said third insulating layer, including filling said aperture with said shield material, thereby forming a second pedestal that is electrically connected to said second sense lead.

* * * * *